(12) United States Patent
Munz et al.

(10) Patent No.: US 7,264,460 B2
(45) Date of Patent: Sep. 4, 2007

(54) INSTALLATION FOR PREPARING MATERIALS

(75) Inventors: Rainer Munz, Murrhardt (DE); Jürgen Strecker, Korntal (DE)

(73) Assignee: Coperion Werner & Pfleiderer GmbH & Co. KG (DE)

( * ) Notice: Subject to any disclaimer, the term of this patent is extended or adjusted under 35 U.S.C. 154(b) by 0 days.

(21) Appl. No.: 10/557,432

(22) Filed: Nov. 16, 2005

(65) Prior Publication Data

US 2006/0240133 A1   Oct. 26, 2006

(30) Foreign Application Priority Data

May 28, 2003 (EP) ................................. 03011994

(51) Int. Cl.
*B29C 47/40* (2006.01)
*B29C 47/66* (2006.01)

(52) U.S. Cl. .................. 425/205; 366/83; 366/91; 425/190; 425/204; 425/382.4

(58) Field of Classification Search ............... 425/186, 425/190, 192 R, 204, 205, 382.4; 366/76.4, 366/83, 91
See application file for complete search history.

(56) References Cited

U.S. PATENT DOCUMENTS

| | | | |
|---|---|---|---|
| 2,607,953 A | 8/1952 | Richardson et al. | |
| 3,261,056 A | 7/1966 | Fritsch | |
| 3,923,291 A * | 12/1975 | Matsuoka et al. | 366/77 |
| 4,332,480 A * | 6/1982 | Anders | 366/77 |
| 4,410,477 A | 10/1983 | Claude | |
| 4,416,605 A * | 11/1983 | Konno et al. | 425/185 |
| 4,490,046 A * | 12/1984 | Guibert | 366/76.4 |
| 4,984,977 A * | 1/1991 | Grimminger et al. | 425/145 |
| 5,582,848 A * | 12/1996 | Manser | 425/190 |
| 5,762,975 A | 6/1998 | Rockstedt | |
| 5,863,117 A * | 1/1999 | Gheorghita | 366/85 |
| 6,375,450 B1 * | 4/2002 | Golomb et al. | 425/199 |

FOREIGN PATENT DOCUMENTS

| | | |
|---|---|---|
| DE | 2 304 088 | 8/1973 |
| EP | 1 005 411 B1 | 7/2000 |
| GB | 1127958 | 9/1968 |
| GB | 1 364 725 | 8/1974 |

* cited by examiner

*Primary Examiner*—Robert Davis
*Assistant Examiner*—Joseph Leyson
(74) *Attorney, Agent, or Firm*—McGlew and Tuttle P.C.

(57) ABSTRACT

A material processing plant comprises a first screw-type extruding machine (1) and a second screw-type extruding machine (2) which is disposed downstream thereof. Between the two screw-type extruding machines (1, 2), provision is made for a delivery zone (28) where a delivery orifice is provided, extending radially of the axes (12a, 13a) of the casing bores (12, 13) of the first screw-type extruding machine (1) and being directed towards the second screw-type extruding machine (2). The at least one casing bore (12, 13) of the first screw-type extruding machine (1) is lockable in the direction of its axis (12a, 13a) by means of a sealing element.

12 Claims, 4 Drawing Sheets

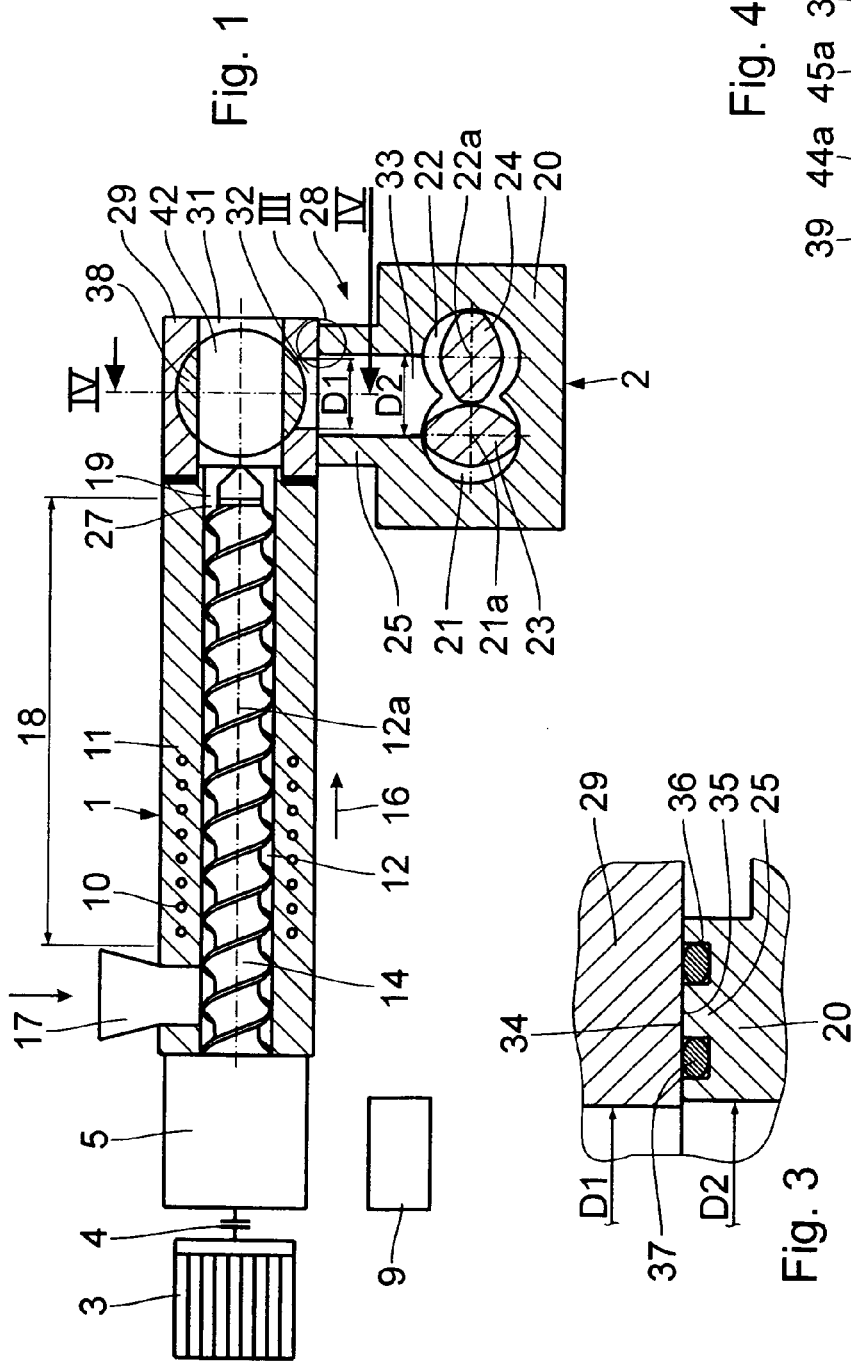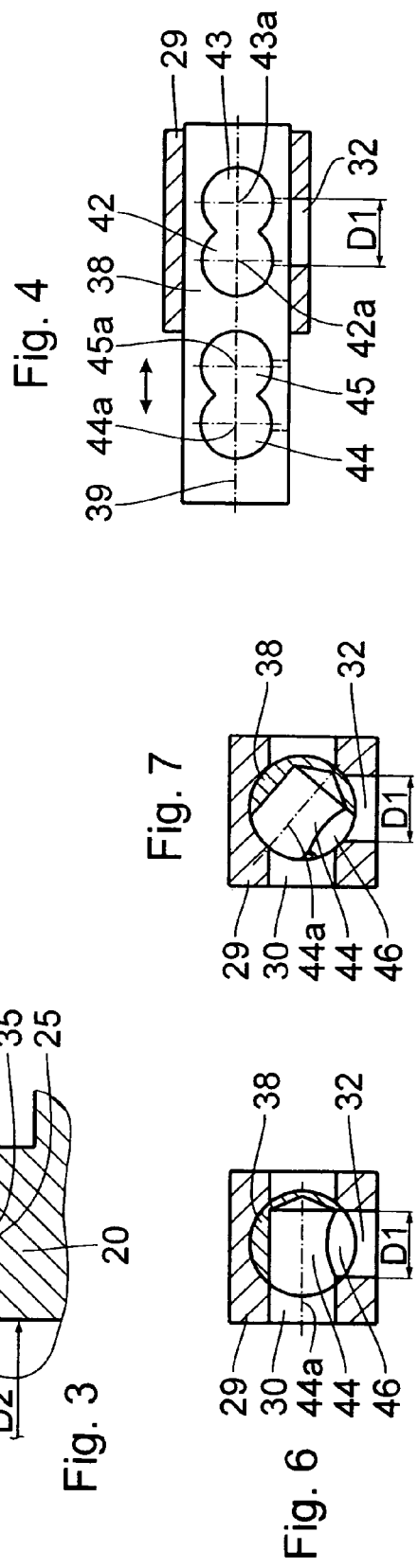

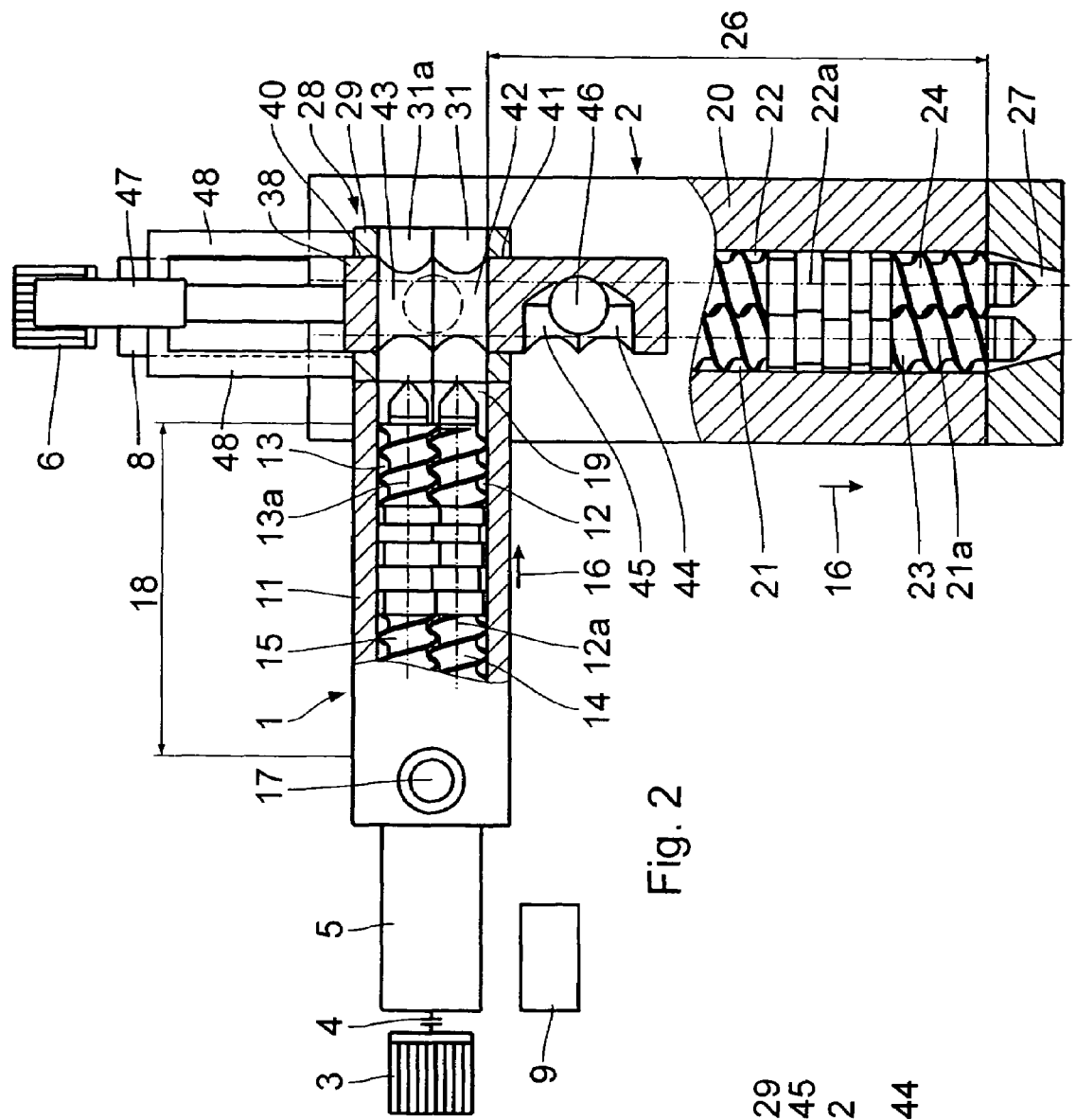
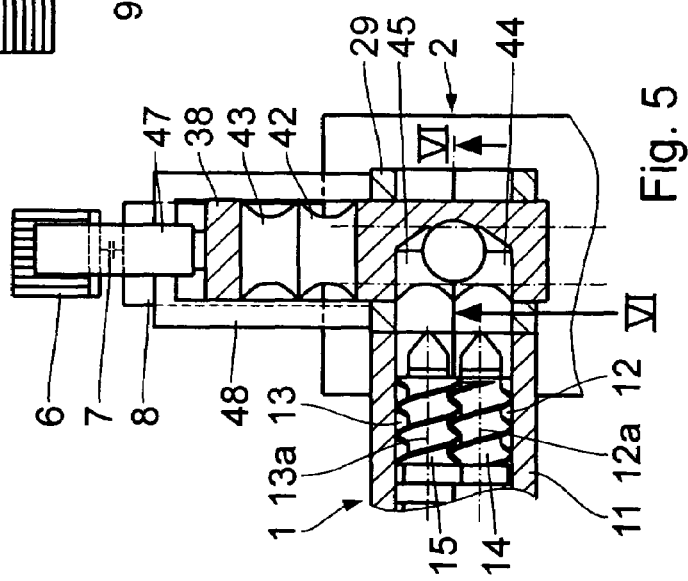
Fig. 2
Fig. 5

US 7,264,460 B2

INSTALLATION FOR PREPARING MATERIALS

CROSS REFERENCE TO RELATED APPLICATIONS

This application is a United States National Phase application of International Application PCT/EP2004/004157 filed on Apr. 8, 2004 and claims the benefit of priority under 35 U.S.C. § 119 of European Application Number 03 011 994.5 filed May 28, 2003, the entire contents of which are incorporated herein by reference.

FIELD OF THE INVENTION

The present invention pertains to a material processing plant.

BACKGROUND OF THE INVENTION

In particular in the processing of plastics, it is often reasonable to provide two or several successive extruders, each of which performing individual processing steps. For example, when plastic material is used in the form of powder, inlet and melting of the powder can take place in a first extruder.

Homogenizing and pressure build-up then takes place in a second, downstream extruder. Successive extruder arrangements of the generic type are known for example from EP 1 005 41 1 B 1, U.S. Pat. No. 3,261,056 and DE 2 304 088 A. In the plants of the generic type known from literature and practice, the connecting parts, which often have a weight of several tons, are hard to remove and re-insert, with removal of the connecting parts being indispensable for the screw shafts of the first extruder to be pulled out. In practice, pulling out the screw shaft through the discharge zone is customary, because the other end is provided with the motor, coupling and transmission and pulling out the screw shaft there poses serious problems.

SUMMARY OF THE INVENTION

It is an object of the invention to develop a plant of the generic type in such a way that pulling the screw shaft or shafts of the first screw-type extruding machine is especially easy and time-saving.

According to the invention, this object is attained by the features of a first extruder. The first extruder comprises a casing with at least one first casing bore having an axis and a first screw shaft which is disposed in the at least one first casing bore. A second extruder is disposed downstream of the first extruder. A delivery zone connects the first extruder to the second extruder and which is provided with a delivery orifice that extends radially of the axis and is directed towards the second extruder. The at least one first casing bore, in a direction of the axis, is lockable by means of a sealing element. The sealing element can preferably be a movable body having at least one through bore that is movable for congruence with the corresponding casing bore. This body can be a revolute body or a slide body. The body can be a revolute slide body, which offers numerous additional functions to be implemented.

The various features of novelty which characterize the invention are pointed out with particularity in the claims annexed to and forming apart of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a vertical sectional view of a first embodiment of a plant according to the invention in a screw-shaft pull-out position;

FIG. 2 is a plan view, partially broken open, of the plant according to the first embodiment;

FIG. 3 is a view of a detail III of FIG. 1;

FIG. 4 is a partial sectional view of the plant on the line IV-IV of FIG. 1;

FIG. 5 is a partial plan view, partially broken open, of the plant in a modified position of operation as opposed to FIG. 2;

FIG. 6 is a sectional view of FIG. 5 on the line VI-VI in a non-throttled position of delivery;

FIG. 7 is a partial sectional view of FIG. 5 on the line VI-VI in a throttled position;

DESCRIPTION OF THE PREFERRED EMBODIMENTS

Figure 8:
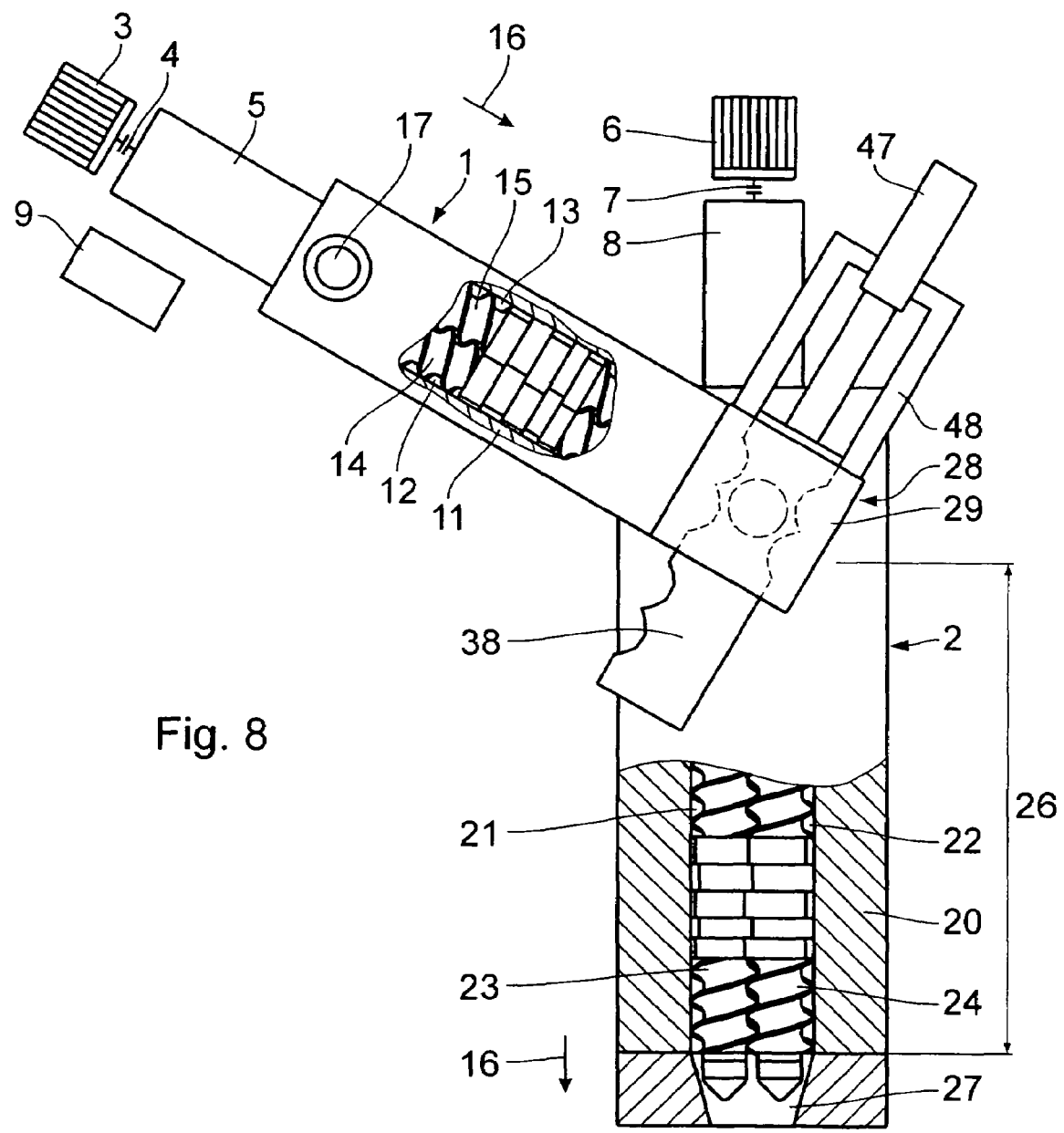
FIG. 8 is a vertical sectional view of a second embodiment of a plant according to the invention in a sealing position.

Referring to the drawings, the first embodiment seen in FIGS. 1 to 8 comprises a first extruder 1 and a second extruder 2. The first extruder 1 is disposed above the second extruder 2. The first extruder 1 is actuated by a first motor 3 via a first coupling 4 and a first transmission 5. The second extruder 2 is driven by a second motor 6 via a second coupling 7 and a second transmission 8. Control of the motors 3 and 6 takes place by way of a control unit 9.

The first extruder 1 comprises a casing 11 which is provided with a heating system 10 and has two first casing bores 12, 13 with axes 12a, 13a that are parallel to one another, the casing bores 12, 13 being disposed parallel to each other in approximately figure-eight-type interengagement. Two first screw shafts 14, 15 are disposed in these casing bores 12, 13; they are coupled with the first transmission 5. The screw shafts 14, 15 are driven in the same or opposite directions. The first extruder 1 comprises a feed hopper 17 which is disposed downstream of the first transmission 5 as seen in a feed direction 16 and which is followed by a single or several processing zones 18.

A discharge zone 19 is provided at the end of the first extruder 1, discharge in a direction of the axes 12a, 13a taking place from the discharge zone 19. Instead of two casing bores and correspondingly two screw shafts, it is just as well possible to have only a single bore or three and more bores and a corresponding number of screw shafts.

The second extruder 2 also comprises a casing 20 where two casing bores 21, 22 are disposed, having axes 21a, 22a that are parallel to each other, and interengaging i.e., also defining a figure-eight-type cross-sectional shape. Two screw shafts 23,24 are disposed in the second casing bores 21, 22; they are coupled with the second transmission 8 and drivable to rotate in the same or opposite directions. Subsequently to the second transmission 8, the second extruder 2 comprises a feeder connection piece 25 which is followed by one or several processing zones 26 in the feed direction 16. A discharge zone 27 is again provided at the end of the second extruder 2.

In the first embodiment according to FIGS. 1 to 7, an intermediate casing 29 is provided in the delivery zone 28, having an interior 30 which is connected with the first casing bores 12, 13. The intermediate casing 29 is connected with the casing 11 of the first extruder by a sliding connection 31 by way of which to compensate thermal expansions. The interior 30 consists of two bores of figure-eight-type interengagement which are parallel to the axes 12a, 13a. The diameter $D_2$ of these bores is equal to, or slightly exceeds, the diameter $D_1$ of the first casing bores 12, 13. They are through bores, the intermediate casing 29 being open at its end turned away from the casing 11.

Radially of the axes 12a, 13a i.e., crosswise of the horizontal plane spanned by these axes 12a, 13a, the intermediate casing 29 comprises a delivery orifice 32 which opens into the feeder connection piece 25 of the second extruder 2. The overflow passage 33 which is formed in the feeder connection piece 25 has a diameter $D_3$. $D_1 \leq D_2 \leq D_3$ applies. In this way, dead spots, where plastic material deposits, are prevented from forming along the flow path of the material, in particular molten plastic material, from the first extruder 1 to the second extruder 2.

The intermediate casing 29 rests by an adjoining face 34 on an adjoining face 35, turned thereto, of the feeder connection piece 25. The intermediate casing 29 is not fixed by screwing to the feeder connection piece 25. According to FIG. 3, the adjoining face 35 is provided with recesses 36 where packings 37 are disposed, sealing towards the adjoining face 34.

A revolute slide body 38 is disposed in the intermediate casing 29; it is rotatable about its central longitudinal axis 39 and displaceable in the direction of its central longitudinal axis between two end positions. The central longitudinal axis 39 is parallel to the plane spanned by the axes 12a, 13a and perpendicular to each of these axes 12a, 13a and parallel to the axes 21a, 22a of the second casing bores of the second extruder 2. The revolute slide body 38 is of cylindrical external shape and displaceably guided in two adapted guide bores 40,41 of the intermediate casing 29.

The revolute slide body 38 comprises two through bores 42,43 of figure-eight-type interengagement, the axes 42a, 43a of which are in alignment with the axes 12a, 13a. These through bores 42,43 each have a diameter $D_2$. FIGS. 1 and 2 illustrate these through bores 42,43 in their functional position upstream of the first casing bores 12, 13 i.e., in a screw-shaft pull-out position, in which the revolute slide body 38 simultaneously closes the delivery orifice 32 that opens out radially.

In this position of the revolute slide body 38, the first screw shafts 14, 15 can be pulled out of the first casing bores 12, 13, namely through the revolute slide body 38 of the intermediate casing 29. Moreover, in this end position of the revolute slide body 38, plastic material can be transferred outwards upon start-up of the plant.

In the direction of the central longitudinal axis 39 of the revolute slide body 38, a pair of blind bores 44, 45 of figure-eight-type interengagement is provided by the side of the pair of through bores 42,43, the axes 44a, 45a of the blind bores 44,45 being in alignment with the axes 12a, 13a when in a position of congruence therewith. The diameter of these blind bores 44, 45 is also $D_2$. Crosswise of the axes 44a, 45a of the blind bores 44,45, a connecting bore 46 is formed in the revolute slide body 38, the diameter of which is $D_3$. The blind bores 44,45 and the connecting bore 46 constitute a delivery passage. Upon displacement of the revolute slide body 38 from the described screw-shaft pull-out position into its other end position, the first casing bores 12, 13 of the first extruder 1 are connected to the feeder connection piece 25, and thus to the second extruder 2, by way of the intermediate casing 29 and the blind bores 44,45. The revolute slide body 38, when in this position of delivery, is in the operational position of the plant. By the revolute slide body 38 being pivoted about the axis 39 in this second end position i.e., in the position of delivery, the flow of plastic material can be throttled, becaus—as seen in FIGS. 6 and 7—the free cross section between the connecting bore 46 and the delivery orifice 32 in the intermediate casing 29 is modifiable. Upon a pivoting motion by 90°, the delivery orifice 32 can be closed completely by the revolute slide body 38 in both end positions of the revolute slide body 38.

The sliding and pivoting motions of the revolute slide body 38 are carried out by a rotary slide drive 47 which is mounted on the casing 11 of the first extruder 1 by means of a retaining device 48. Such a drive can be a commercial, hydraulically operable piston-cylinder drive.

Of course, the slide body 38 can be embodied without the revolute function that serves for throttling. In this case, the drive 47 is a pure sliding drive, displacing the slide 38 between two end positions i.e., the screw-shaft pull-out position and the delivery position.

Figure 10:
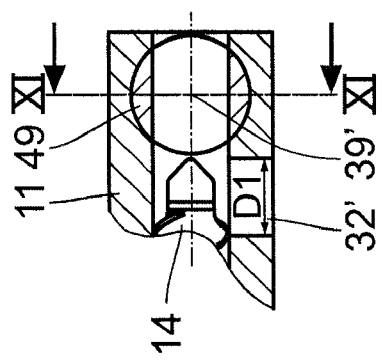
FIG. 10 is a sectional view on the line X-X of FIG. 9.
Figure 9:
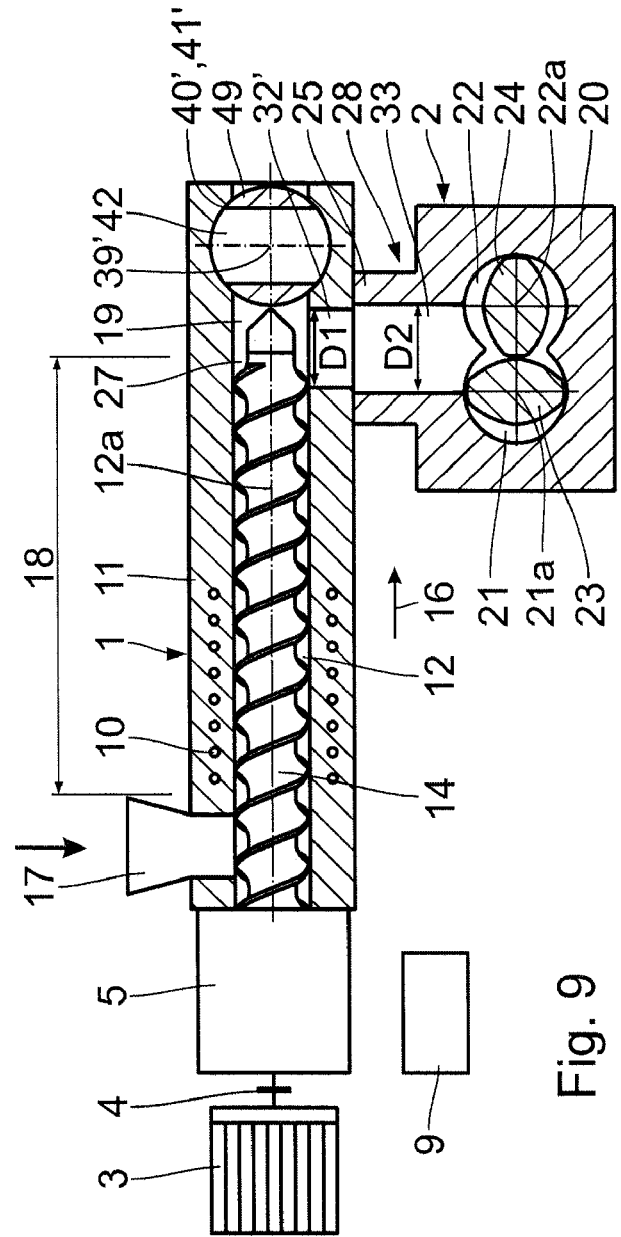
FIG. 9 is a vertical partial sectional view of the second embodiment in a screw-shaft pull-out position.

No special intermediate casing is provided in the embodiment according to FIGS. 8 to 10; rather, in the delivery zone 28, the delivery orifice 32' opens directly from the casing 11 into the feeder connection piece 25. In the casing 11, provision is made for guide bores 40', 41 in which a revolute body 49 is rotarily guided. The revolute body 49 comprises two through bores 42,43 which the above description applies to. The pivoting motion of the revolute body 49 about its central longitudinal axis 39' takes place by a drive (not shown) which corresponds to that of the first embodiment, but which allows only a rotary motion. Otherwise the above description of the first embodiment applies.

While specific embodiments of the invention have been shown and described in detail to illustrate the application of the principles of the invention, it will be understood that the invention may be embodied otherwise without departing from such principles.

The invention claimed is:

1. A material processing plant, comprising:
 a first extruder comprising a casing with at least one first casing bore, said at least one first casing bore having a defined longitudinal axis, said first extruder having a first end and a second end, said second end being located downstream of said first end;
 a first screw shaft located within said at least one first casing bore;
 a feed hopper located at said first end;
 a motor actuating said first screw shaft, said motor being located in an area of said first end;
 a second extruder arranged downstream of said first extruder;
 a delivery zone located in an area of said second end, said delivery zone connecting said first extruder to said second extruder, said delivery zone having a defined delivery orifice extending radially of said longitudinal axis and directed towards said second extruder;
 a sealing element with a movable body having at least one through bore, said movable body being movable from a screw-shaft pull-out position to a sealing position, said at least one through bore being aligned with said at least one first casing bore in said screw-shaft pull-out position, said sealing element being located at said second end.

2. A material processing plant according to claim 1, wherein said movable body is a revolute body having a defined central longitudinal axis, said revolute body being rotated about said central longitudinal axis from said screw-shaft pull-out position to said sealing position.

3. A material processing plant according to claim 1, wherein said movable body is a slide body, said slide body comprising a delivery passage located on the side of the at least one through bore, said delivery passage connecting the at least one first casing bore and the delivery orifice in said sealing position for form a position of delivery.

4. A material processing plant according to claim 3, wherein said slide body is a revolute slide body, said delivery passage being moved such that said delivery passage is partially congruent with the delivery orifice in said position of delivery.

5. A material processing plant according to claim 1, wherein said movable body is arranged in the casing of the first extruder.

6. A material processing plant according to claim 1, wherein said movable body is located in an intermediate casing which is attached to the casing of the first extruder.

7. A material processing plant according to claim 1, wherein said movable body is movable by a drive.

8. A material processing plant, comprising:
a first extruder having a casing with at least one first casing bore having a defined longitudinal axis, said first extruder having a first end and a second end, said second end being located downstream of said first end;
a first screw shaft located within said at least one first casing bore;
a second extruder arranged downstream of said first extruder;
a delivery zone defined in an area of said second end, said delivery zone connecting said first extruder to said second extruder, said delivery zone having a defined delivery orifice extending radially of said longitudinal axis and directed towards said second extruder;
an intermediate casing with a movable body having at least one through bore, said movable body being movable from a screw-shaft pull-out position to a sealing position, said at least one through bore being aligned with said at least one first casing bore in said screw-shaft pull-out position for removal of said first screw shaft.

9. A plant according to claim 8, wherein said movable body is a revolute body having a defined central longitudinal axis, said revolute body being rotated about said central longitudinal axis from said screw-shaft pull-out position to said sealing position.

10. A material processing plant according to claim 8, wherein said movable body is a slide body, said slide body comprising a delivery passage located on the side of the at least one through bore, said delivery passage connecting the at least one first casing bore and the delivery orifice in said sealing position for form a position of delivery.

11. A material processing plant according to claim 10, wherein said slide body is a revolute slide body, said delivery passage being moved such that said delivery passage is partially congruent with the delivery orifice in said position of delivery.

12. A material processing plant according to claim 8, wherein said movable body is movable by a drive.

* * * * *

UNITED STATES PATENT AND TRADEMARK OFFICE
CERTIFICATE OF CORRECTION

PATENT NO. : 7,264,460 B2  Page 1 of 1
APPLICATION NO. : 10/557432
DATED : September 4, 2007
INVENTOR(S) : Munz et al.

It is certified that error appears in the above-identified patent and that said Letters Patent is hereby corrected as shown below:

Title Page Insert

(86)  PCT No.:   PCT/EP2004/004157
      Date:   April 8, 2004

(87)  PCT Pub. No.:  WO 2004/106033 A1
      PCT Pub. Date:   December 9, 2004

Signed and Sealed this

Twenty-seventh Day of November, 2007

JON W. DUDAS
*Director of the United States Patent and Trademark Office*